United States Patent
Verma et al.

(10) Patent No.: US 10,015,174 B2
(45) Date of Patent: Jul. 3, 2018

(54) USING COMMUNICATION CHARACTERISTICS OF A STATION TO VERIFY IDENTITY INFORMATION

(71) Applicant: QUALCOMM Incorporated, San Diego, CA (US)

(72) Inventors: Lochan Verma, San Diego, CA (US); Gang Ding, San Diego, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 15/071,384

(22) Filed: Mar. 16, 2016

(65) Prior Publication Data
US 2017/0272937 A1 Sep. 21, 2017

(51) Int. Cl.
*H04L 29/06* (2006.01)
*H04L 29/08* (2006.01)
(Continued)

(52) U.S. Cl.
CPC .......... *H04L 63/126* (2013.01); *H04L 67/12* (2013.01); *H04W 4/70* (2018.02); *H04W 12/10* (2013.01); *H04W 8/22* (2013.01); *H04W 84/12* (2013.01)

(58) Field of Classification Search
CPC ... H04W 8/24; H04W 4/005; H04W 72/0445; H04W 84/12
See application file for complete search history.

(56) References Cited

U.S. PATENT DOCUMENTS 8,069,248 B2 11/2011 Sherman
8,619,658 B2 12/2013 Sammour et al.
(Continued)

OTHER PUBLICATIONS

IEEE: "Draft Standard for Information Technology—Telecommunications and Information Exchange between Systems Local and Metropolitan Area Networks—Specific Requirements Part 11: Wireless LAN Medium Access Control (MAC) and Physical Layer (PHY) Specifications Amendment 2: Sub 1 GHz License Exempt Operation", Feb. 2016 (Feb. 2016), pp. i,5,6,13-41,96-189,189-193,238,239,277-299,398-332,343,356,358-361,378-389,419-515, XP002769582, Retrieved from the Internet: URL:http://ieeexplore.ieee.org/stamp/stamp.jsp?tp=&arnumber=7412659 [retrieved on Apr. 24, 2017].
(Continued)

*Primary Examiner* — Duc C Ho
(74) *Attorney, Agent, or Firm* — Loza & Loza, LLP

(57) ABSTRACT

Various aspects provide for receiving identity information from a station (STA) that identifies the STA as a sensor-type STA, determining whether communication attributes of the STA correlates with communication attributes expected for a sensor-type STA, and determining that the identity information received from the STA is false when the one or more communication attributes of the STA is uncorrelated with the one or more communication attributes expected for a sensor-type STA. Additional aspects provide for initiating one or more remedial actions upon determining that the identity information is false. The communication attributes may pertain to packet size, inter-arrival time, and/or inter-arrival time variance. The remedial actions may include blocking a future communication with the STA, communicating a warning message to the STA, and/or assigning the STA to a particular access window. Communications by the STA may comply with aspects of Institute of Electrical and Electronics Engineers (IEEE) 802.11ah.

30 Claims, 9 Drawing Sheets

(51) Int. Cl.
*H04W 12/10* (2009.01)
*H04W 4/70* (2018.01)
*H04W 84/12* (2009.01)
*H04W 8/22* (2009.01)

(56) References Cited

U.S. PATENT DOCUMENTS

| | | |
|---|---|---|
| 8,638,812 B2 | 1/2014 | Morioka et al. |
| 8,787,293 B2 | 7/2014 | De La Broise et al. |
| 9,143,983 B2 | 9/2015 | Xhafa et al. |
| 2013/0127618 A1 | 5/2013 | Sheleheda et al. |
| 2014/0313908 A1* | 10/2014 | da Silva ............. H04W 4/005 370/252 |
| 2015/0319609 A1 | 11/2015 | Asterjadhi et al. |
| 2016/0014149 A1 | 1/2016 | Bradley et al. |
| 2016/0014189 A1* | 1/2016 | Yamashima ............ H04L 67/02 709/217 |
| 2016/0323897 A1* | 11/2016 | Veyseh ............... H04W 72/085 |
| 2016/0344693 A1* | 11/2016 | Wetterwald ........... H04L 61/103 |

OTHER PUBLICATIONS

International Search Report and Written Opinion—PCT/US2017/018474—ISA/EPO—dated May 9, 2017.
Onat I., et al., "A Real-Time Node-Based Traffic Anomaly Detection Algorithm for Wireless Sensor Networks", Systems Communications, 2005. Proceedings Montreal, Canada Aug. 14-17, 2005, Piscataway, NJ, USA, IEEE, Aug. 14, 2005 (Aug. 14, 2005), pp. 422-427, XP010839819.
Wang Q., et al., "Detecting Anomaly Node Behavior in Wireless Sensor Networks", Advanced Information Networking and Applications Workshops, 2007, AINAW '07. 21st International Conference on, IEEE, Piscataway, NJ, USA, May 21, 2007 (May 21, 2007), pp. 451-456, XP031334562.

* cited by examiner

USING COMMUNICATION CHARACTERISTICS OF A STATION TO VERIFY IDENTITY INFORMATION

TECHNICAL FIELD

Aspects of the present disclosure relate, generally, to wireless communication systems and, more particularly, to using communication characteristics of a station to verify identity information.

BACKGROUND

Wireless communication networks are widely deployed to provide various communication services such as telephony, video, data, messaging, broadcasts, and so on. Such networks, which are usually multiple access networks, support communications for multiple users by sharing the available network resources. Within such wireless networks a variety of data services may be provided, including voice, video, and emails. Some networks provide particular time periods for accessing the wireless medium by specific types of devices. If a device misrepresents its device type to the network, that device may wrongfully gain privileges to those particular time periods, thereby consuming valuable network resources that could otherwise be used by other devices. Enhancements that relate to such aspects may benefit the wireless communication network and enhance the overall user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the present disclosure provides an apparatus for wireless communication. The apparatus includes a transceiver, a memory, and at least one processor communicatively coupled to the transceiver and the memory. In some examples, the at least one processor and the memory may be configured to receive identity information from a station (STA), wherein the identity information identifies the STA as a sensor-type STA. The at least one processor and the memory may be further configured to determine whether one or more communication attributes of the STA correlates with one or more communication attributes expected for a sensor-type STA. The at least one processor and the memory may be further configured to determine that the identity information received from the STA is false when the one or more communication attributes of the STA is uncorrelated with the one or more communication attributes expected for a sensor-type STA.

In another aspect, the present disclosure provides a method for wireless communication. In some examples, the method may include receiving identity information from an STA, wherein the identity information identifies the STA as a sensor-type STA. The method may also include determining whether one or more communication attributes of the STA correlates with one or more communication attributes expected for a sensor-type STA. The method may also include determining that the identity information received from the STA is false when the one or more communication attributes of the STA is uncorrelated with the one or more communication attributes expected for a sensor-type STA.

In yet another aspect, the present disclosure provides a computer-readable medium storing computer-executable code. In some examples, the computer-executable code may include instructions configured to receive identity information from an STA, wherein the identity information identifies the STA as a sensor-type STA. The instructions may be further configured to determine whether one or more communication attributes of the STA correlates with one or more communication attributes expected for a sensor-type STA. The instructions may be further configured to determine that the identity information received from the STA is false when the one or more communication attributes of the STA is uncorrelated with the one or more communication attributes expected for a sensor-type STA.

In a further aspect of the present disclosure, the present disclosure provides an apparatus for wireless communication. In some examples, the apparatus may include means for receiving identity information from an STA, wherein the identity information identifies the STA as a sensor-type STA. The apparatus may also include means for determining whether one or more communication attributes of the STA correlates with one or more communication attributes expected for a sensor-type STA. The apparatus may also include means for determining that the identity information received from the STA is false when the one or more communication attributes of the STA is uncorrelated with the one or more communication attributes expected for a sensor-type STA.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DESCRIPTION OF SOME EXAMPLES

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, certain structures and components are shown in block diagram form in order to avoid obscuring such concepts.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
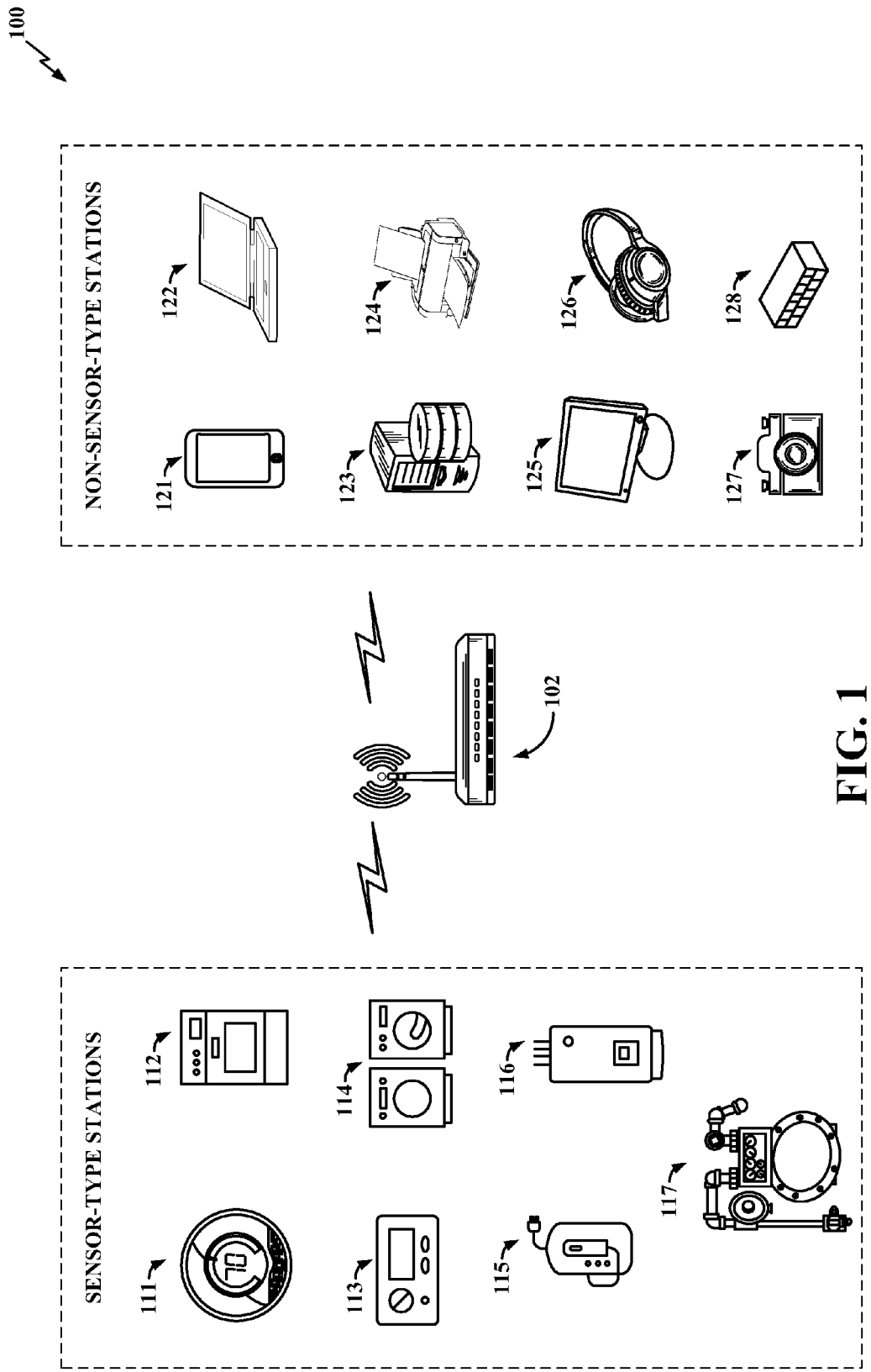
FIG. 1 is a diagram illustrating an example of various apparatuses in a communication network according to aspects of the present disclosure.

FIG. 1 is a diagram 100 illustrating an example of various apparatuses in a communication network according to aspects of the present disclosure. In this example, the communication network includes various apparatuses, such as an access point (AP) 102 and various stations (STAs). Generally, the AP 102 is configured to communicate with downstream apparatuses (e.g., STAs). One of ordinary skill in the art will understand that the AP 102 may be referred to as a base station, a base transceiver station, a radio base station, a radio transceiver, a node, a relay, a transmitter, a scheduler, a scheduling entity, a mesh node, a peer, and/or any other suitable terminology without deviating from the scope of the present disclosure. Generally, the STAs are each configured to communicate with upstream apparatuses (e.g., AP 102) and possibly with other downstream apparatuses (not shown).

One of ordinary skill in the art will understand that the examples described herein with reference to the AP 102 are not intended to necessarily limit the scope of the present disclosure. Any aspect described herein with reference to the AP 102 may be implemented and/or applied with respect to any non-AP apparatus without deviating from the scope of the present disclosure. In other words, any aspect described herein with respect to AP 102 may be implemented and/or applied with respect to a peer-to-peer device, an ad-hoc device, an Internet-of-things device, an Internet-of-everything device, a relay, a sensor device, a non-sensor device, and various other suitable apparatus without deviating from the scope of the present disclosure. Accordingly, any aspect described herein may be applied to non-AP and/or non-infrastructure-type networks, such as ad-hoc networks, peer-to-peer networks, and various other suitable networks, without deviating from the scope of the present disclosure.

One of ordinary skill in the art will understand that any of the apparatuses (e.g., STAs) downstream of the AP 102 may be referred to as a user equipment (UE), a mobile phone, a cellular phone, a smart phone, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a mesh node, a peer, a session initiation protocol phone, a laptop, a notebook, a netbook, a smartbook, a personal digital assistant, a satellite radio, a global positioning system device, a multimedia device, a video device, a digital audio player, a camera, a game console, an entertainment device, a vehicle component, a wearable computing device (e.g., a smart watch, glasses, a health or fitness tracker, etc.), an appliance, a sensor, a vending machine, and/or any other suitable terminology without deviating from the scope of the present disclosure.

The concepts presented throughout this disclosure may be implemented across a broad variety of wireless communication systems, network architectures, and communication standards. The apparatuses in the communication network may utilize at least some algorithms and/or protocols corresponding to a standard promulgated by Institute of Electrical and Electronics Engineers (IEEE), such as IEEE 802.11. The IEEE is a standards body that defines several wireless communication standards for networks involving an upstream apparatus (e.g., AP 102) and a downstream apparatus (e.g., STA(s)). Although some examples provided herein may be described with reference to a particular communication standard, one of ordinary skill in the art will understand that aspects of the present disclosure may be implemented in various wireless communication systems that may or may not conform to any communication standard, whether or not promulgated by the IEEE, without deviating from the scope of the present disclosure.

One non-limiting example of such a communication standard is IEEE 802.11ah. IEEE 802.11ah characterizes some STAs as sensor STAs and some other STAs as non-sensor STAs. Accordingly, in some examples, a 'sensor-type STA' refers to a 'sensor STA' as defined in IEEE 802.11ah, and a 'non-sensor-type STA' refers a 'non-sensor STA' as defined in IEEE 802.11ah. Generally, a non-sensor-type STA refers to any STA that is not a sensor-type STA. Nevertheless, one of ordinary skill in the art will also understand that a sensor-type STA and a non-sensor-type STA may have alternative and/or more expansive definitions relative to those provided in IEEE 802.11ah without deviating from the scope of the present disclosure. In some examples, a sensor-type STA may have a packet size limitation that is smaller than a packet size limitation of a non-sensor-type STA. In some examples, a sensor-type STA may have an inter-arrival time requirement that is different from an inter-arrival time requirement of a non-sensor-type STA. In some examples, a sensor-type STA may have an inter-arrival time variance that is less than an inter-arrival time variance of a non-sensor-type STA. In some examples, a sensor-type STA may have a traffic volume limitation that is less than a traffic volume limitation of a non-sensor-type STA. In some examples, a sensor-type STA may have a transmit power limitation that is less than a transmit power limitation of a non-sensor-type STA. In some examples, a sensor-type STA may have a battery power requirement that is different from a battery power requirement of a non-sensor-type STA.

One of ordinary skill in the art will understand that the communication network may include fewer or additional apparatuses relative to the apparatuses illustrated in FIG. 1 without deviating from the scope of the present disclosure. One of ordinary skill in the art will understand that the example illustrated in FIG. 1 is provided for illustrative purposes and is not intended to limit the scope of the present disclosure. Non-limiting examples of sensor-type STAs illustrated in FIG. 1 include a thermostat 111, a stove 112, an irrigation controller 113, a washer and dryer 114, an electric vehicle charging station 115, a water heater 116, and a utility meter 117. Non-limiting examples of non-sensor-type STAs illustrated in FIG. 1 include a mobile phone 121, a laptop computer 122, a network/server computer 123, a printer 124, a peripheral/external display device 125, headphones 126, a camera 127, and a router/hub 128.

Figure 2:
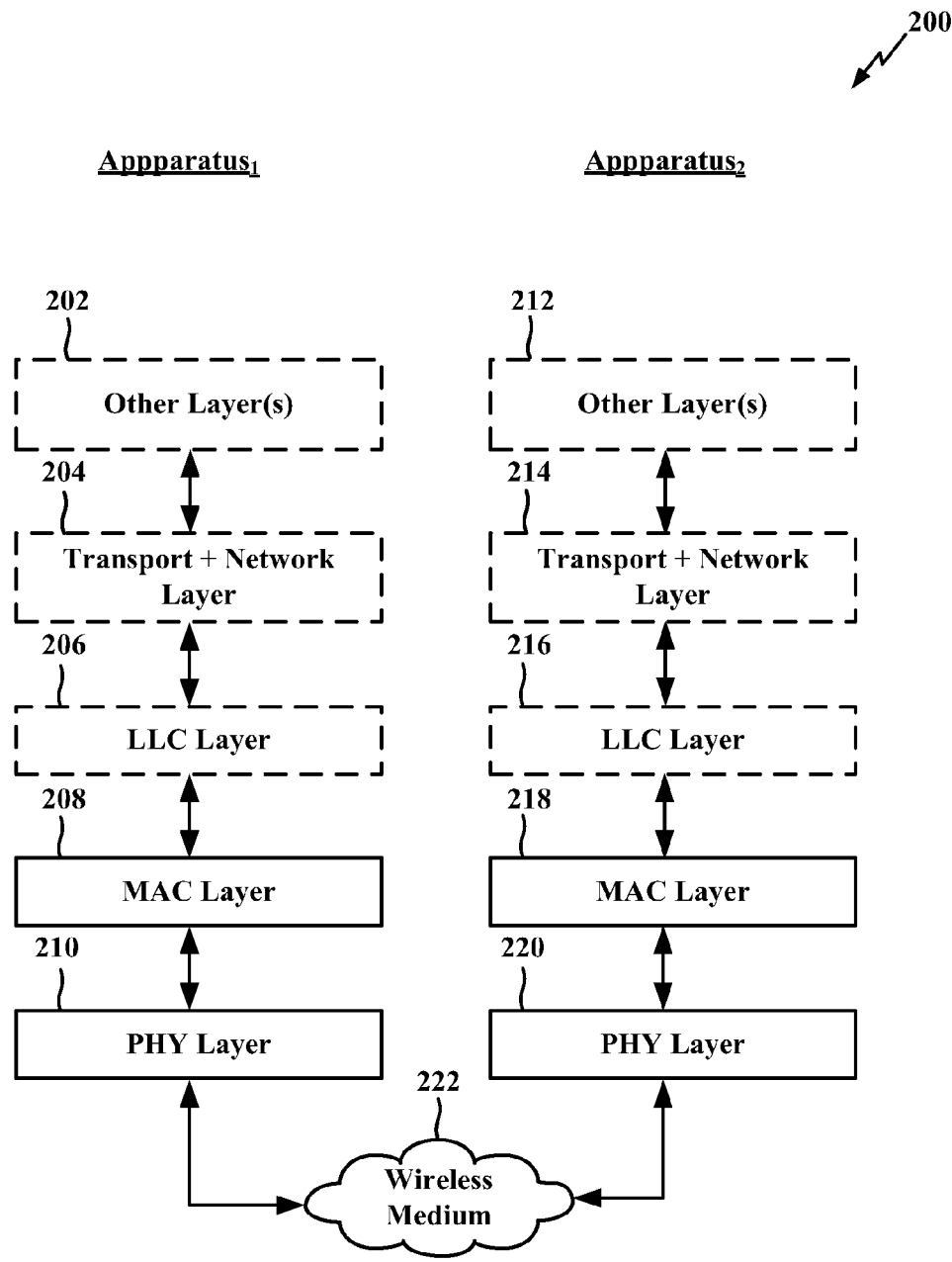
FIG. 2 is a diagram illustrating an example of various protocol layers of a wireless communication network according to aspects of the present disclosure.

FIG. 2 is a diagram 200 illustrating an example of various protocol layers of a wireless communication network according to aspects of the present disclosure. The protocol layers illustrated in FIG. 2 may be utilized by various apparatuses without deviating from the scope of the present disclosure. In some, $Apparatus_1$ may be the AP 102 described above with reference to FIG. 1. In some examples, $Apparatus_2$ may be any one or more the STAs described above with reference to FIG. 1. The protocol layers illustrated in FIG. 2 shall not be construed as a limitation of the present disclosure. One of ordinary skill in the art will understand that fewer, additional, and/or alternative protocol layers may be implemented without deviating from the scope of the present disclosure. For instance, various protocol layers not illustrated in FIG. 2 may exist between any of the layers illustrated in FIG. 2 without deviating from the scope of the present disclosure. One of ordinary skill in the art will also understand that such protocol layers may be utilized in various configurations, even if not illustrated in FIG. 2, without deviating from the scope of the present disclosure. In some configurations, as illustrated in FIG. 2, the protocol layers may include transport and network layers 204, 214, logical link control (LLC) layers 206, 216, medium access control (MAC) layers 208, 218, physical (PHY) layers 210, 220, and/or various other layers 202, 212. In some examples, such other layers 202, 212 may include an application layer, a protocol access layer (PAL), and/or various other suitable layers.

The transport and network layers 204, 214 may facilitate the flow of the data traffic to one or more devices via Internet protocol (IP) links. For example, $Apparatus_1$ and $Apparatus_2$ may be separated by an IP network. $Apparatus_1$ and $Apparatus_2$ may be direct clients of a transmission control protocol (TCP). The data traffic may be packaged into IP datagrams and delivered through TCP connections. However, the transport and network layers 204, 214 may not exist in all configurations of the present disclosure, such as when the data traffic is not being transmitted from the host to the device via IP links. The transport and network layers 204, 214 may also perform other functions and/or include other features not described herein without deviating from the scope of the present disclosure.

The LLC layers 206, 216 may be the upper sublayer of a data link layer. The LLC layers 206, 216 may provide multiplexing mechanisms to enable various network protocols to coexist within a multipoint network and to be transported over the same network medium. The LLC layers 206, 216 may also control data flows as well as provide error management. The LLC layers 206, 216 may also perform other functions and/or include other features not described herein without deviating from the scope of the present disclosure. The LLC layers 206, 216 interface between the network layers (e.g., transport and network layers 204, 214) and the MAC layers (e.g., MAC layers 208, 218).

The MAC layers 208, 218 may be the lower sublayer of the data link layer. The MAC layers 208, 218 may provide addressing and channel access control mechanisms that enable various terminals or network nodes to communicate within a multiple-access network having a shared medium (e.g., a wireless medium according to IEEE 802.11). The MAC layers 208, 218 may emulate a full-duplex logical communication channel in a multi-point network, and such a channel may provide unicast, multicast, and/or broadcast communication service(s). The MAC layers 208, 218 may also perform other functions and/or include other features not described herein without deviating from the scope of the present disclosure. The MAC layers 208, 218 may interface between the LLC layers 206, 216 and the network PHY layers 210, 220.

The PHY layers 210, 220 may include network hardware transmission technologies. The PHY layers 210, 220 may provide the means for transmitting data traffic. The PHY layers 210, 220 may provide an electrical, mechanical, and/or procedural interface to the wireless medium 222. The PHY layers 210, 220 may specify various attributes of the data traffic, such as the frequency on which the data traffic is transmitted, the modulating scheme of the data traffic, and other related attributes of the data traffic. The PHY layers 210, 220 may also perform other functions and/or include other features not described herein without deviating from the scope of the present disclosure. The PHY layers 210, 220 may transmit the data traffic to another apparatus via the wireless medium 222. The wireless medium 222 may be utilized in accordance with IEEE 802.11. The wireless medium 222 may also be utilized in accordance with various other communication standards. The wireless medium 222 may interface between the PHY layer 210 of $Apparatus_1$ and the PHY layer 220 of $Apparatus_2$.

Figure 3:
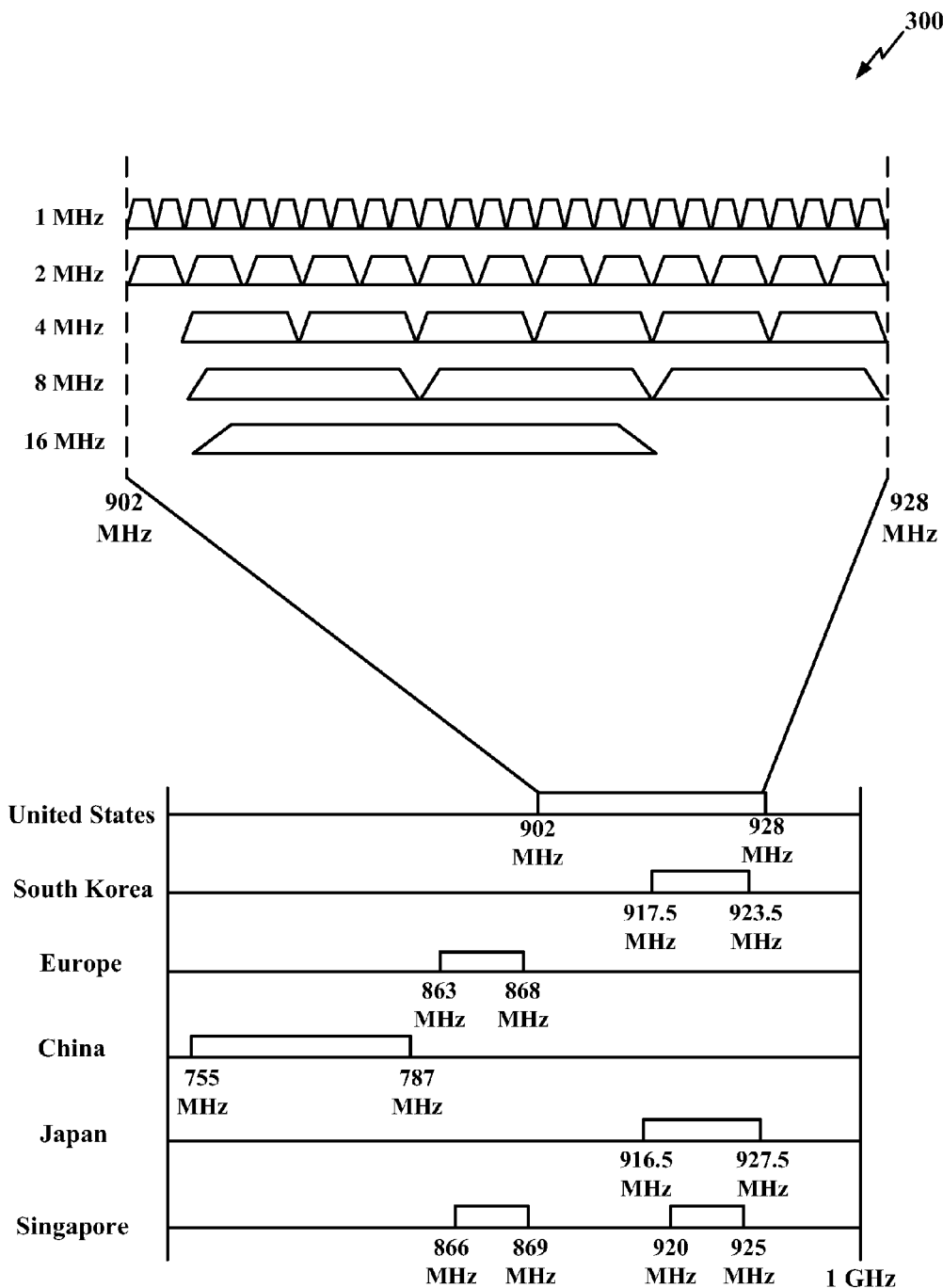
FIG. 3 is a diagram illustrating an example of channelization according to aspects of the present disclosure.

FIG. 3 is a diagram 300 illustrating an example of channelization according to aspects of the present disclosure. The available sub-1 GHz (S1G) frequency bands may be different depending on the country. Accordingly, IEEE 802.11ah has defined channelization based on the available wireless spectra in various countries, including the United States, South Korea, China, Europe, Japan, and Singapore. Generally, FIG. 3 illustrates the IEEE 802.11ah channelization in these countries. In the United States, the S1G frequency band is 26 MHz, positioned between 902 MHz and 928 MHz. Accordingly, the number of available 1 MHz channels is 26. In order to achieve a higher bandwidth, several adjacent channels can be bonded together to yield a wider channel. For instance, a 2 MHz channel may be composed of two adjacent 1 MHz channels. The widest channel supported in the US is 16 MHz channel, which is also the widest channel bandwidth supported in IEEE 802.11ah.

The IEEE 802.11ah-compliant channels outside of the United States may be different than those inside of the United States. In South Korea, such channels begin from 917.5 MHz and end at 923.5 MHz, which provides a 6 MHz bandwidth. In Europe, such channels begin from 863 MHz and end at 868 MHz, which provides a 5 MHz bandwidth. In China, such channels begin from 755 MHz and end at 787 MHz, which provides a 32 MHz bandwidth. In Japan, such channels begin at 916.5 MHz and end at 927.5 MHz, which provides an 11 MHz bandwidth. In Singapore, some channels begin at 866 MHz and end at 869 MHz, providing a 3 MHz bandwidth, and some other channels begin at 920 MHz and end at 925 MHz, providing a 5 MHz bandwidth.

One of ordinary skill in the art will understand that the example frequencies provided with reference to FIG. 3 are for illustrative purposes and therefore shall not be construed as a limitation of the present disclosure. Any aspect described herein may be implemented and/or applied with respect to various frequencies (e.g., even if not described with reference to FIG. 3) without deviating from the scope of the present disclosure.

Figure 4:
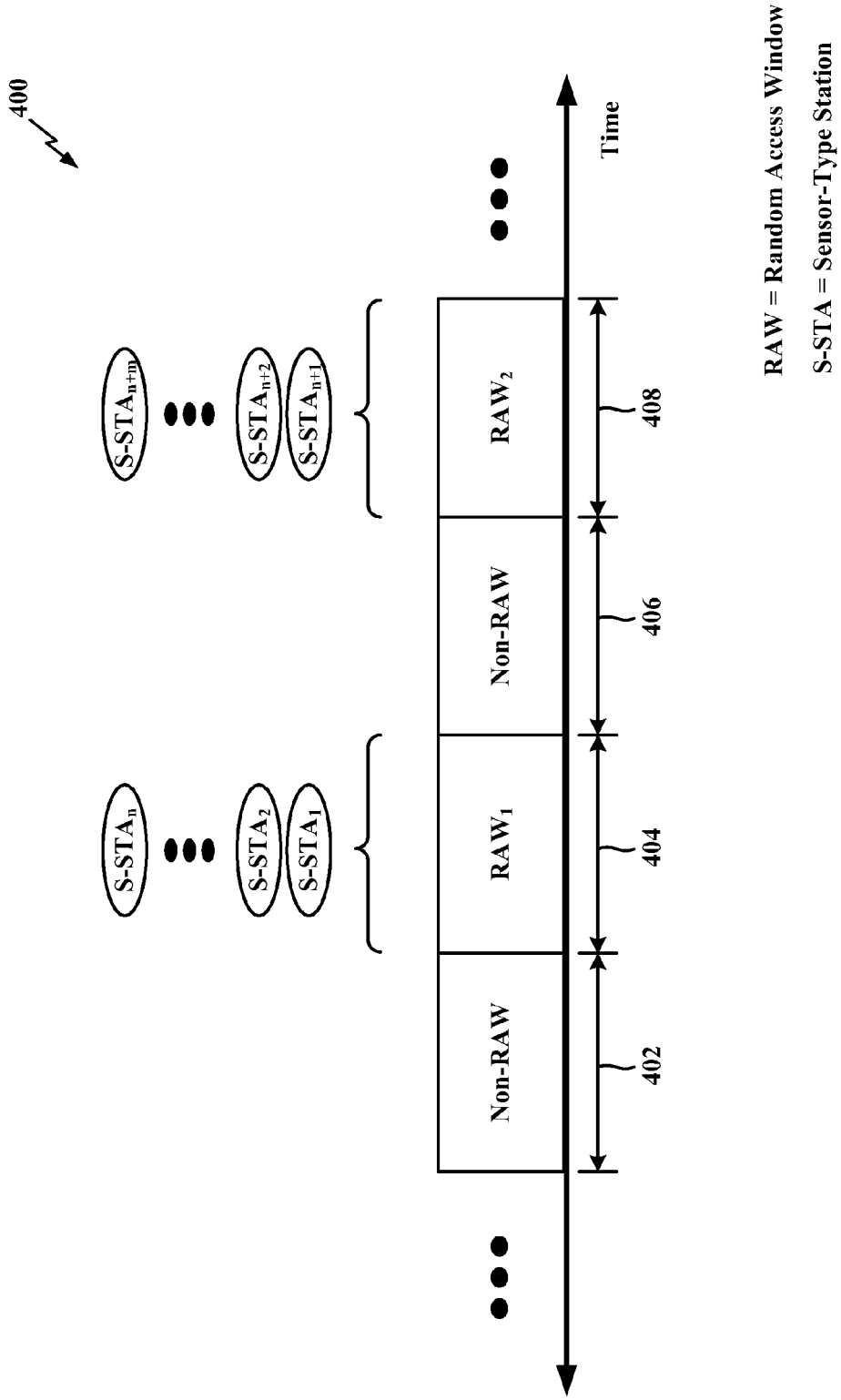
FIG. 4 is a diagram illustrating an example of random access windows (RAWs) according to aspects of the present disclosure.

FIG. 4 is a diagram 400 illustrating an example of random access windows (RAWs) according to aspects of the present disclosure. Some wireless communication standards (e.g., IEEE 802.11ah) dedicate particular periods of time for wireless communications by specific types of STAs. Those specific types of STAs may have specific privileges that are not given to other types of STAs. During such periods of time, those specific types of STAs are allowed to contend for the wireless medium, and the other types of STAs are prohibited from contending for the wireless medium during those periods of time. The other types of STAs are nevertheless allowed to contend for the wireless medium during other periods of time. In other words, access to the wireless medium may be restricted during particular periods of time. In some examples, such periods of time may be referred to as RAWs. In other words, a RAW represents a specific duration of time during which only specific types of STAs that have the requisite privilege(s) are allowed to contend for the wireless medium.

For example, referring to the example illustrated in FIG. 4, a first time period 402 may be a non-RAW, during which the wireless medium is not restricted to specific types of STAs having particular privileges. A second time period 404 may be a RAW (e.g., $RAW_1$), during which the wireless medium may be restricted to specific types of STAs having particular privileges. A third time period 406 may be a non-RAW, and a fourth time period may be a RAW (e.g., $RAW_2$). As illustrated in FIG. 4, a specific type of STA (e.g., a sensor-type STA (S-STA)) has privileges to contend for the wireless medium during the RAWs (e.g., $RAW_1$, $RAW_2$). For examples, $S-STA_1$ through $S-STA_n$ have privileges to contend for the wireless medium during $RAW_1$, and $S-STA_{n+1}$ through $S-STA_{n+m}$ have privileges to contend for the wireless medium during $RAW_2$. Various aspects pertaining to a sensor-type STA are provided above with reference to FIG. 1 and therefore will not be repeated.

The privileges described above may be provided by the network based on the STA type. For example, a sensor-type STA may receive the aforementioned privileges, and a non-sensor-type STA may not receive those privileges. These privileges may be provided to the sensor-type STA to ensure that this type of STA has regular and periodic opportunities to contend for the wireless medium. Without such privileges, the sensor-type STA may not have ample opportunity to contend for the wireless medium if non-sensor-type STAs overwhelm the network with their communications. For example, a non-sensor-type STA may consume a relatively high amount of network resources while streaming video content, which may reduce the likelihood that the sensor-type STA(s) will receive access to the wireless medium.

An AP may determine whether to grant the aforementioned privileges to a particular STA based on certain identity information provided by that STA. For example, a STA may transmit certain identity information to the AP in order to advertise that it is a sensor-type STA. Some existing APs may grant privileges to such a STA simply based on the identity information transmitted to it. In other words, some APs may not perform additional verification to determine the truthfulness or accuracy of that identity information advertised by the STA. Accordingly, if a STA misrepresents (e.g., 'spoofs') its identity information, existing APs may provide such misrepresenting STAs with privileges to which that STA is not truly entitled. For example, a non-sensor-type STA may misrepresent that it is a sensor-type STA and thereby gain privileges to which it is not truly entitled. When the misrepresenting non-sensor-type STA obtains privileges reserved for sensor-type STAs, that misrepresenting non-sensor-type STA can gain access to the RAWs. In other words, the misrepresenting non-sensor-type STA will be able to contend for the wireless medium during the RAW(s) that are dedicated for sensor-type STAs. The resources consumed by that misrepresenting non-sensor-type STA during the RAW(s) are resources that will not be available to the sensor-type STAs. Accordingly, there is an increased likelihood that sensor-type STAs will be resource-deprived when misrepresenting non-sensor-type STA wrongfully gain privileges to the RAWs. Enhancements that relate to such aspects may benefit the wireless communication network.

Figure 5:
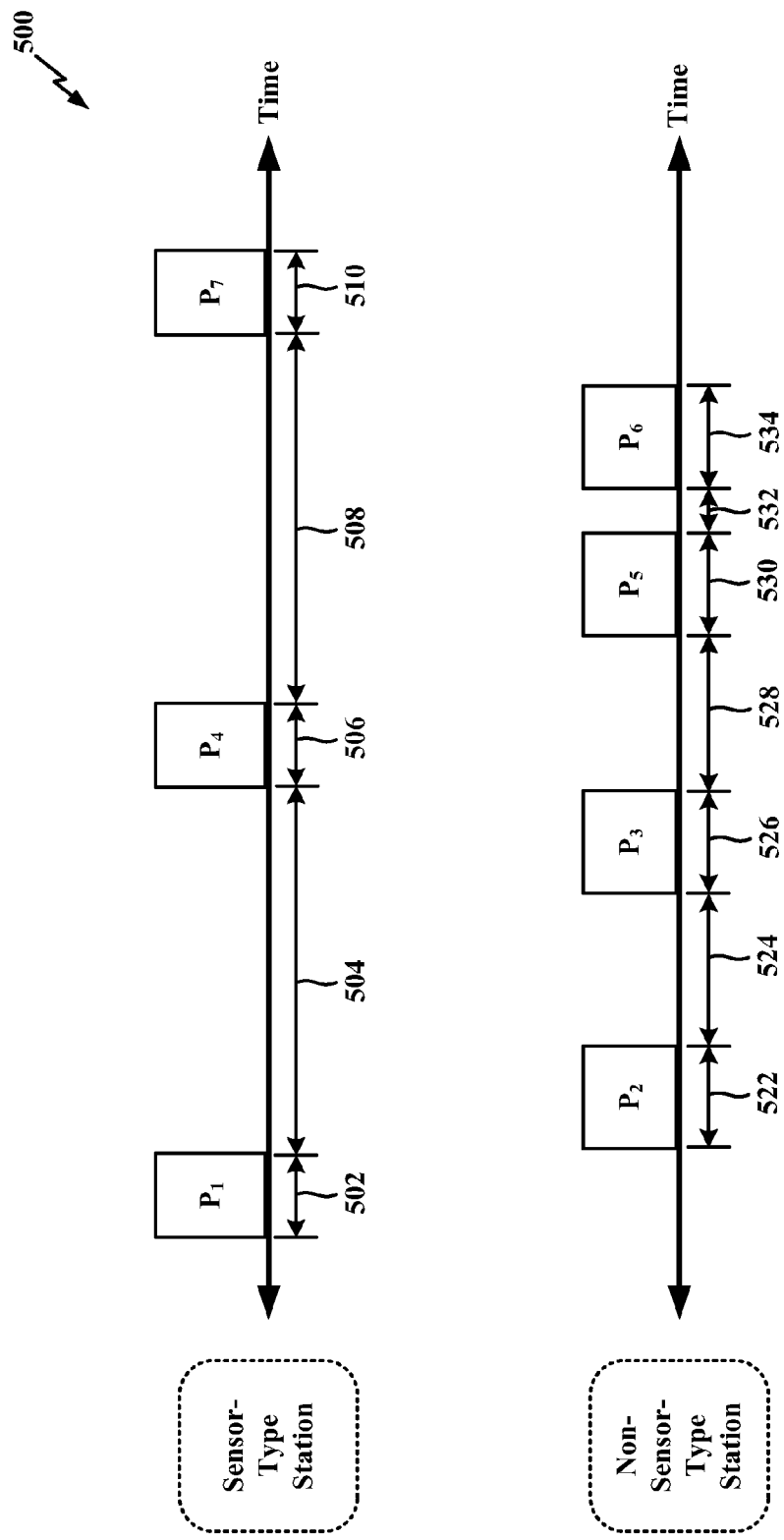
FIG. 5 is a diagram illustrating an example of communication attributes by various stations (STAs) according to aspects of the present disclosure.

FIG. 5 is a diagram 500 illustrating an example of communication attributes by various STAs according to aspects of the present disclosure. The AP may receive identity information from a STA, and the identity information may identify the STA as a sensor-type STA or non-sensor-type STA. If the identity information identifies the STA as a non-sensor-type STA, then that STA will not receive privileges to the RAW and, therefore, the above-identified concerns regarding a misrepresenting (e.g., 'spoofing') STA are moot. In other words, even if that STA is truly a sensor-type STA that is misrepresenting itself as a non-sensor-type STA, that STA will nonetheless not receive privileges to the RAW and, therefore, verification of the truthfulness of its identity information may not be warranted. However, if the identity information identifies the STA as a sensor-type STA, then the above-identified concerns about a misrepresenting non-sensor-type STA wrongfully gaining privileges to the RAW are applicable, and verification of the truthfulness of its identity information may be warranted.

When the AP receives identity information that indicates that the STA is a sensor-type STA, then the AP may determine whether one or more communication attributes of the STA correspond to one or more communication attributes expected for a typical sensor-type STA to determine whether the identity information received from the STA is false. For example, the AP may determine whether one or more communication attributes of the STA correlates with one or more communication attributes expected for a typical sensor-type STA to determine whether the identity information received from the STA is false. One of ordinary skill in the art will understand that such communication attributes may include various parameters, measurements, signals, and/or information pertaining to the communication behavior of the STA without deviating from the scope of the present disclosure. The non-limiting examples of communication attributes described herein are provided for illustrative purposes and not intended to necessarily limit the scope of the present disclosure.

In some examples, the communication attributes may refer to the packet size. For example, the AP may determine whether a size of a packet received from the STA (that identified itself as a sensor-type STA) correlates with a size of a packet expected for a typical sensor-type STA. Generally, the size of the packet received from a sensor-type STA is smaller than the size of the packet received from a non-sensor-type STA. For example, as illustrated in FIG. 5, the duration 502, 506, 510 utilized to communicate packets $P_1$, $P_4$, $P_7$ by the sensor-type STA is less than the duration 522, 526, 530, 534 utilized to communicate packets $P_2$, $P_3$, $P_5$, $P_6$ by the non-sensor-type STA. Information about the size of the packet expected for a typical sensor-type STA may be stored and/or retrieved from various sources without deviating from the scope of the present disclosure, including the examples described below with reference to FIGS. 6-9. By comparing the size of the packet received by the STA (that identified itself as a sensor-type STA) with a size of a packet expected for a typical sensor-type STA, the AP can determine whether the identity information received from the STA is false.

In some examples, the communication attributes may refer to the inter-arrival time of the packets. For example, the AP may determine whether the inter-arrival time of packets received from the STA (that identified itself as a sensor-type STA) correlates with the inter-arrival time of packets expected for a typical sensor-type STA. As used herein, the term 'inter-arrival time' refers to the duration of time between consecutive arrived packets. Generally, the inter-arrival time of packets received from a sensor-type STA is greater than the inter-arrival time of packets received from a non-sensor-type STA. For example, as illustrated in FIG. 5, the duration 504, 508 between consecutive arrived packet $P_1$, $P_4$, $P_7$ for the sensor-type STA is commonly greater than the duration 524, 528, 532 between consecutive arrived packets $P_2$, $P_3$, $P_5$, $P_6$ for the non-sensor-type STA. Information about the inter-arrival time of the packets expected for a typical sensor-type STA may be stored and/or retrieved from various sources without deviating from the scope of the present disclosure, including the examples described below with reference to FIGS. 6-9. By comparing the inter-arrival time of the packets received by the STA (that identified itself as a sensor-type STA) with inter-arrival time of packets expected for a typical sensor-type STA, the AP can determine whether the identity information received from the STA is false.

In some examples, the communication attributes may refer to the inter-arrival time variance of the packets. For example, the AP may determine whether the inter-arrival time variance of packets received from the STA (that identified itself as a sensor-type STA) correlates with the inter-arrival time variance of packets expected for a typical sensor-type STA. As used herein, the term 'inter-arrival time variance' refers to the variance (e.g., difference, discrepancy, inconsistency, variation, etc.) between two (or more) durations of time between consecutive arrived packets. Generally, the inter-arrival time variance of packets for a sensor-type STA is less than the inter-arrival time variance of packets received for a non-sensor-type STA. In other words, the communications of a sensor-type STA are more periodic than communications of a non-sensor-type STA. For example, as illustrated in FIG. 5, the variance between two (or more) of the durations 504, 508 between consecutive arrived packet $P_1$, $P_4$, $P_7$ for the sensor-type STA is commonly less than the variance between two (or more) of the durations 524, 528, 532 between consecutive arrived packets $P_2$, $P_3$, $P_5$, $P_6$ for the non-sensor-type STA. Information about the inter-arrival time variance of the packets expected for a typical sensor-type STA may be stored and/or retrieved from various sources without deviating from the scope of the present disclosure, including the examples described below with reference to FIGS. 6-9. By comparing the inter-arrival time variance of the packets received by the STA (that identified itself as a sensor-type STA) with inter-arrival time variance of packets expected for a typical sensor-type STA, the AP can determine whether the identity information received from the STA is false.

As described in greater detail above, the AP may determine whether the identity information received from the STA is false by comparing one or more communication attributes of the STA with one or more communication attributes expected for a typical sensor-type STA. In many configurations, the AP may determine that the identity information is not false even though the one or more communication attributes of the STA (that identified itself as a sensor-type STA) do not perfectly match the one or more communication attributes expected for a typical sensor-type STA. In other words, the AP may sometimes determine that the identity information is not false even though the one or more communication attributes of the STA (that identified itself as a sensor-type STA) deviates from the one or more communication attributes expected for a typical sensor-type STA. So long as the one or more communication attributes of the STA (that identified itself as a sensor-type STA) are sufficiently correlated with the one or more communication attributes expected for a typical sensor-type STA, the AP may determine that the identity information is not false.

However, the AP may determine that the identity information received from the STA (that identified itself as a sensor-type STA) is false when the one or more communication attributes of the STA are insufficiently correlated with the one or more communication attributes expected for a typical sensor-type STA. In some configurations, the one or more communication attributes of the STA (that identified itself as a sensor-type STA) are insufficiently correlated with the one or more communication attributes expected for a typical sensor-type STA when the one or more communication attributes of the STA deviate by more than a predetermined amount from the one or more communication attributes expected for a typical sensor-type STA. That predetermined amount may be a percentage based on a particular value, a fixed quantity or value, a particular standard deviation relative to a reference value, and/or various other metrics without deviating from the scope of the present disclosure. One of ordinary skill in the art will understand that the exact value may vary between particular designs and implementations without deviating from the scope of the present disclosure.

If the AP determines that the identity information received from the STA (that identified itself as a sensor-type STA) is false, then the AP may initiate one or more remedial actions. Generally, remedial actions may refer to any process, procedure, protocol, step, and/or other act to rectify, ameliorate, change, fix, clarify, improve, and/or adjust an otherwise non-conforming aspect of the communication system. One of ordinary skill in the art will understand that 'remedial' is a non-limiting term of art that is used to generally describe one or more actions, but the term 'remedial' shall be construed broadly and in accordance with the claimed features. In some examples, the remedial action may be to block one or more future communications with the STA (that misrepresented itself as a sensor-type STA). For example, referring to FIG. 1, the AP 102 may block future communications with any one or more of the non-sensor-type STAs 121-128 (that misrepresented itself as a sensor-type STA). As used herein, the term(s) 'block' and/or 'blocking' may refer to prohibiting, obstructing, hindering, impeding, opposing, stopping, barring, and/or another similar action without deviating from the scope of the present disclosure.

In some examples, the remedial action may be to communicate a warning message to the STA. The warning message may indicate that the identity information received from the STA is false. The warning message may additionally or alternatively indicate any other information without deviating from the scope of the present disclosure. For example, referring to FIG. 4, the AP may communicate the warning message to any one or more of the non-sensor-type STAs 121-128 (that misrepresented itself as a sensor-type STA). As used herein, the term(s) 'communicate' and/or 'communicating' may refer to the utilization of a transceiver (or another similar component/structure) for a transmission of various wireless signals containing information that corresponds to the warning message.

In some examples, the remedial action may include assigning the STA to an access window that is not restricted to sensor-type STAs. For example, referring to FIGS. 1 and 4, the AP may assign any one or more of the non-sensor-type STAs 121-128 (that misrepresented itself as a sensor-type STA) to the non-RAWs instead of the RAWs. Accordingly, instead of contending for the wireless medium during the time period(s) 404, 408 dedicated to sensor-type STAs, the non-sensor-type STA (that misrepresented itself as a sensor-type STA) may contend for the wireless medium during the time periods 402, 406 that are not dedicated to sensor-type STAs. As used herein, the term(s) 'assign' and/or 'assigning' may include allocating, allotting, grouping, appointing, designating, earmarking, and/or various similar terms without deviating from the scope of the present disclosure.

Figure 6:
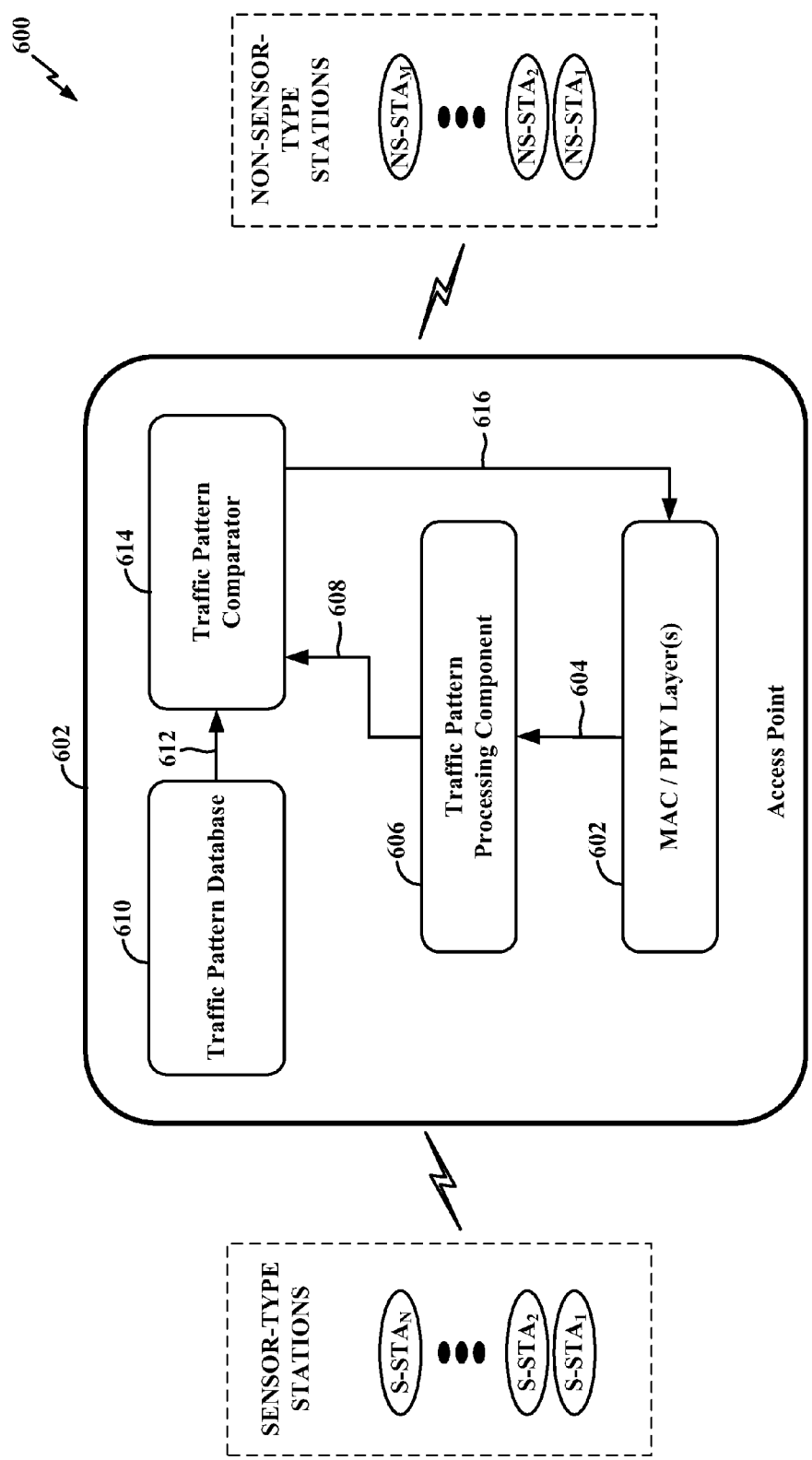
FIG. 6 is a diagram illustrating an example of an access point (AP) according to aspects of the present disclosure.

FIG. 6 is a diagram 600 illustrating an example of an AP 602 according to aspects of the present disclosure. The AP 602 in FIG. 6 may include any one or more of the aspects described herein with reference to any other AP without deviating from the scope of the present disclosure. Additionally, any other AP described herein may include any one or more of the aspects described with reference to the AP 602 in FIG. 6.

In the example illustrated in FIG. 6, the MAC/PHY layer(s) 602 may provide certain information 604 to the traffic pattern processing component 606. Such information 604 may include traffic information, associated identifier (AID) information, and/or station type information. As used herein, a 'component' may refer to one or more circuits, one or more hardware modules, and/or one or more computer-readable/computer-executable instructions stored in a memory (e.g., computer-readable medium) in accordance with aspects of the present disclosure. The traffic pattern processing component 606 may use such information 604 to determine one or more communication attributes of the STA, as described in greater detail herein.

After the traffic pattern processing component 606 determines the one or more communication attributes of the STA, the traffic pattern processing component 606 provides relevant information 608 to the traffic pattern comparator 614. As used herein, the 'comparator' may refer to one or more circuits, one or more hardware modules, and/or one or more computer-readable/computer-executable instructions stored in a memory (e.g., computer-readable medium) in accordance with aspects of the present disclosure. Such information 608 may include one or more communication attributes of the STA. For example, such information 608 may relate to the packet size of communications by the STA, inter-arrival time of communications by the STA, inter-arrival time variance of communications by the STA, AID associated with the STA, STA type information, and/or various other suitable types of information associated with the STA.

The traffic pattern comparator 614 may also receive information 612 from a traffic pattern database 610. Although the example illustrated in FIG. 6 shows the traffic pattern database as being located locally at the AP 602, one of ordinary skill in the art will appreciate that the traffic pattern database may additionally or alternatively be located remotely without deviating from the scope of the present disclosure. The information 612 received from the traffic pattern database 610 may include one or more communication attributes expected for a typical sensor-type STA. For example, such information 612 may relate to the packet size of communications expected for a typical sensor-type STA, inter-arrival time of communications expected for a typical sensor-type STA, inter-arrival time variance of communications expected for a typical sensor-type STA, AID information expected for a typical sensor-type STA, STA type information expected for a typical sensor-type STA, and/or various other suitable types of information expected for a typical sensor-type STA.

The traffic pattern comparator 614 may be configured to determine whether one or more communication attributes of the STA (e.g., based on the information 608 provided by the traffic pattern processing component 606) correlates with one or more communication attributes expected for a typical sensor-type STA (e.g., based on information 612 received from the traffic pattern database 610) to determine whether the identity information received from the STA is false. Various aspects pertaining to such determination and/or comparison processes are described in greater detail herein and therefore will not be repeated. In some configurations, the traffic pattern comparator 614 may output certain information 616 (e.g., AID information, STA type information, and/or status information) back to the MAC/PHY layer(s) 602, as illustrated in FIG. 6. For example, based on the aforementioned determination and/or comparison processes, the traffic pattern comparator 614 may output information 616 that indicates whether the identity information received from the STA is false. Although the example illustrated in FIG. 6 shows such information 616 being provided to the MAC/PHY layer(s) 602, one of ordinary skill in the art will understand that such information 616 may additionally or alternatively be provided to various other protocol layers without deviating from the scope of the present disclosure.

Figure 7:
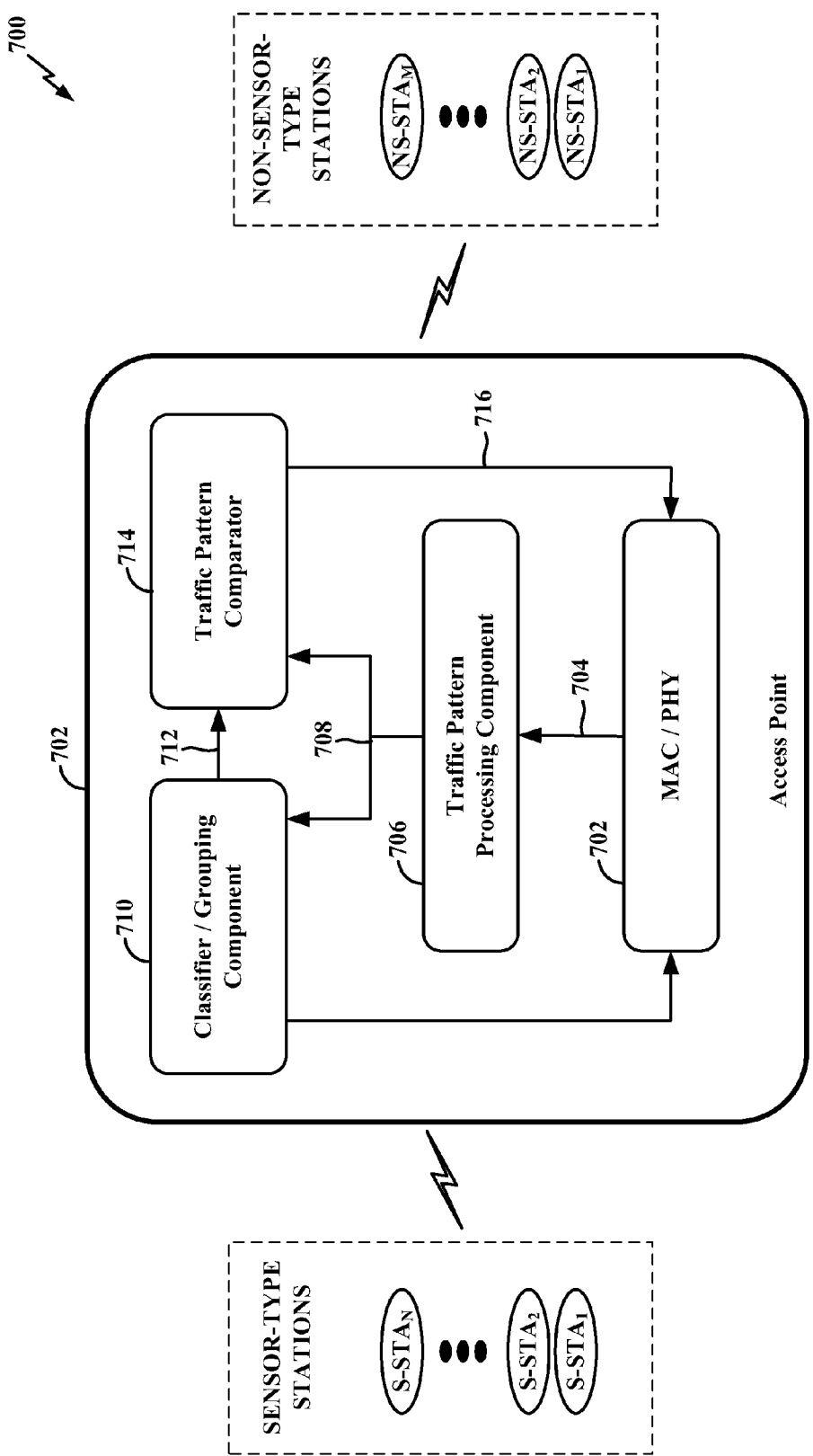
FIG. 7 is a diagram illustrating another example of an AP according to aspects of the present disclosure.

FIG. 7 is a diagram 700 illustrating an example of an AP 702 according to aspects of the present disclosure. The AP 702 in FIG. 7 may include any one or more of the aspects described herein with reference to any other AP without deviating from the scope of the present disclosure. Additionally, any other AP described herein may include any one or more of the aspects described with reference to the AP 702 in FIG. 7.

In the example illustrated in FIG. 7, the MAC/PHY layer(s) 702 may provide certain information 704 to the traffic pattern processing component 706. Such information 704 may include traffic information, AID information, and/or station type information to a traffic pattern processing component. The traffic pattern processing component 706 may use such information 704 to determine one or more communication attributes of the STA, as described in greater detail herein. After the traffic pattern processing component 706 determines the one or more communication attributes of the STA, the traffic pattern processing component 706 provides relevant information 708 to the traffic pattern comparator 714 and/or the classifier/grouping component 710.

Such information 708 may include one or more communication attributes of the STA. For example, such information 708 may relate to the packet size of communications by the STA, inter-arrival time of communications by the STA, inter-arrival time variance of communications by the STA, AID associated with the STA, STA type information, and/or various other suitable types of information associated with the STA. The classifier/grouping component 710 may use various information (e.g., AID information, group number/identifier, traffic pattern information, etc.) to determine one or more communication attributes expected for a particular group or classification of sensor-type STAs. The traffic pattern comparator 714 may be configured to determine whether one or more communication attributes of the STA (e.g., based on the information 708 provided by the traffic pattern processing component 706) correlates with one or more communication attributes expected for a particular classification or grouping of sensor-type STAs (e.g., based on information 712 received from the classifier/grouping component 710) to determine whether the identity information received from the STA is false. Various aspects pertaining to such determination and/or comparison processes are described in greater detail herein and therefore will not be repeated.

In some configurations, the traffic pattern comparator 714 may output certain information 716 (e.g., AID information, group number/identifier, STA type information, status information, warning information, and/or other suitable types of information) back to the MAC/PHY layer(s) 702, as illustrated in FIG. 7. For example, based on the aforementioned determination and/or comparison processes, the traffic pattern comparator 714 may output information 716 that indicates whether the identity information received from the STA is false. Although the example illustrated in FIG. 7 shows such information 716 being provided to the MAC/PHY layer(s) 702, one of ordinary skill in the art will understand that such information 716 may additionally or alternatively be provided to various other protocol layers without deviating from the scope of the present disclosure.

Figure 8:
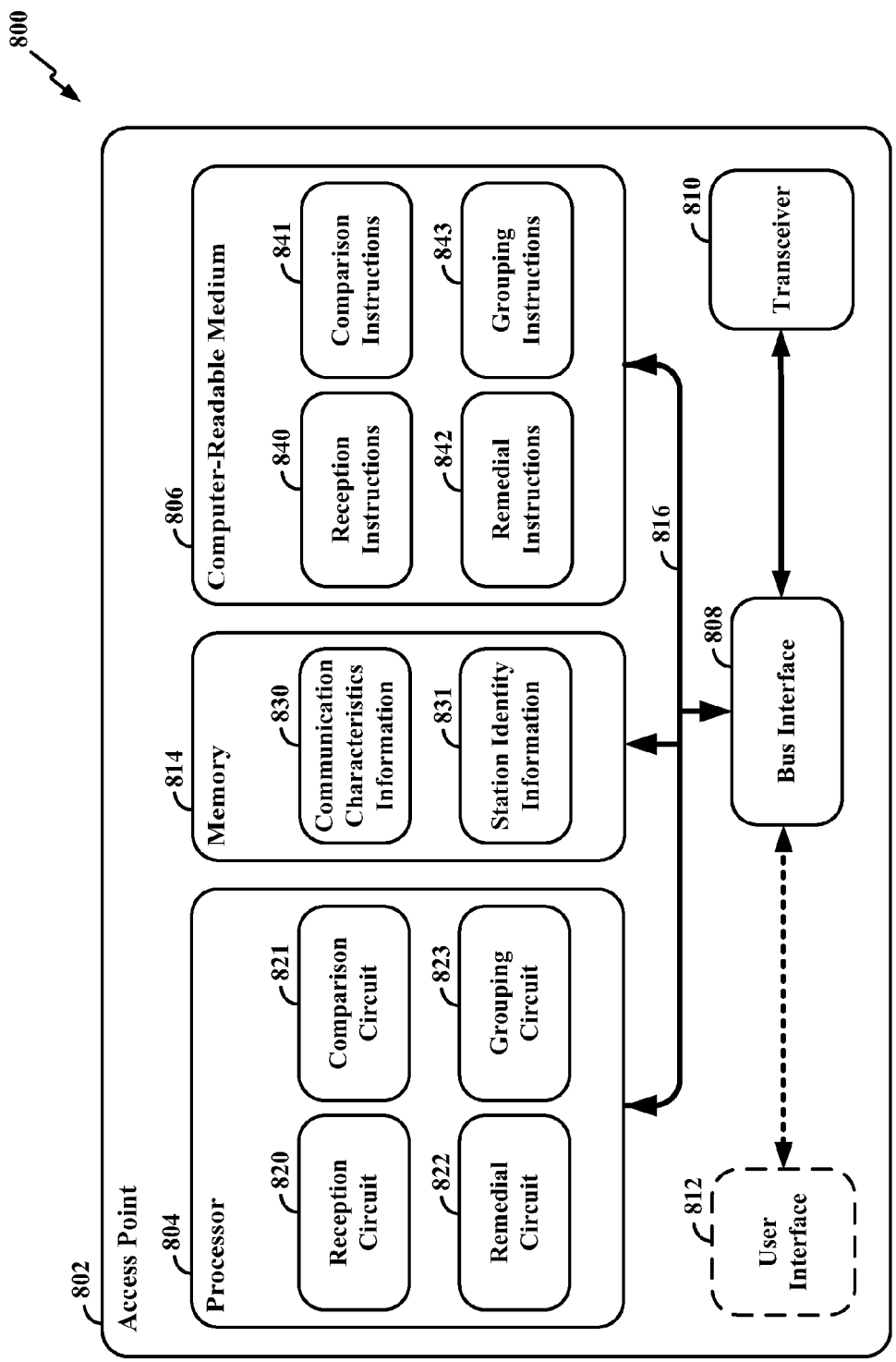
FIG. 8 is a diagram illustrating yet another example of an AP according to aspects of the present disclosure.

FIG. 8 is a diagram 800 illustrating yet another example of an AP 802 according to aspects of the present disclosure. In some aspects, this diagram 800 illustrates an example of a hardware implementation of an AP 802. Generally, the AP 802 may be any device configured for enabling wireless display capabilities. The AP 802 may include a user interface 812. The user interface 812 may be configured to receive one or more inputs from a user of the AP 802. The user interface 812 may also be configured to display information (e.g., text and/or images) to the user of the AP 802. The user interface 812 may exchange data via the bus interface 808.

The AP 802 may also include a transceiver 810. The transceiver 810 may be configured to receive data and/or transmit data in communication with another apparatus. The transceiver 810 provides a means for communicating with another apparatus via a wired or wireless transmission medium. For example, the transceiver 810 may provide the means for communicating with the AP 802, as described in greater detail above. The transceiver 810 may be configured to perform such communications using various types of technologies, as described in greater detail above. One of ordinary skill in the art will understand that many types of technologies may perform such communication without deviating from the scope of the present disclosure.

The AP 802 may also include a memory 814, one or more processors 804, a computer-readable medium 806, and a bus interface 808. The bus interface 808 may provide an interface between a bus 816 and the transceiver 810. The memory 814, the one or more processors 804, the computer-readable medium 806, and the bus interface 808 may be connected together via the bus 816. The processor 804 may be communicatively coupled to the transceiver 810 and/or the memory 814.

The processor 804 may include a reception circuit 820. The reception circuit 820 may include various hardware components and/or may perform various algorithms that provide the means, e.g., in coordination with the transceiver 810, for receiving identity information from a STA, wherein the identity information identifies the STA as a sensor-type STA. The processor 804 may also include a comparison circuit 821. The comparison circuit 821 may include various hardware components and/or may perform various algorithms that provide the means for determining whether one or more communication attributes of the STA correlates with one or more communication attributes expected for a sensor-type STA. The comparison circuit 821 may include various hardware components and/or may perform various algorithms that provide the means for determining that the identity information received from the STA is false when the one or more communication attributes of the STA is uncorrelated with the one or more communication attributes expected for a sensor-type STA. In some configurations, the processor 804 may also include a remedial circuit 822. The remedial circuit 822 may include various hardware components and/or may perform various algorithms that provide the means for initiating one or more remedial actions upon determining that the identity information received from the STA is false. In some configurations, the processor 804 may also include a grouping circuit 823. The grouping circuit 823 may include various hardware components and/or may perform various algorithms that provide the means for assigning a plurality of sensor-type STAs to a RAW based on one or more communication attributes of the plurality of sensor-type STAs.

The foregoing description provides a non-limiting example of the processor 804 of the AP 802. Although various circuits have been described above, one of ordinary skill in the art will understand that the processor 804 may also include various other circuits (not shown) that are in addition and/or alternative(s) to circuits 820, 821, 822, 823. Such other circuits (not shown) may provide the means for performing any one or more of the functions, methods, processes, features and/or aspects described herein.

The computer-readable medium 806 may include various computer-executable instructions. The computer-executable instructions may include computer-executable code configured to perform various functions and/or enable various aspects described herein. The computer-executable instructions may be executed by various hardware components (e.g., the processor 804 and/or any of its circuits 820, 821, 822, 823) of the AP 802. The computer-executable instructions may be a part of various software programs and/or software modules.

The computer-readable medium 806 may include reception instructions 840. The reception instructions 840 may include computer-executable instructions configured for receiving identity information from a STA, wherein the identity information identifies the STA as a sensor-type STA. The computer-readable medium 806 may also include comparison instructions 841. The comparison instructions 841 may include computer-executable instructions configured to determine whether one or more communication attributes of the STA correlates with one or more communication attributes expected for a sensor-type STA. The comparison instructions 841 may include computer-executable instructions configured to determine that the identity information received from the STA is false when the one or more communication attributes of the STA is uncorrelated with the one or more communication attributes expected for a sensor-type STA. In some configurations, the computer-readable medium 806 may include remedial instructions 842. The remedial instructions 842 may include computer-executable instructions configured to initiate one or more remedial actions upon determining that the identity information received from the STA is false. In some configurations, the computer-readable medium 806 may include grouping instructions 843. The grouping instructions 843 may include computer-executable instructions configured to assign a plurality of sensor-type STAs to a RAW based on one or more communication attributes of the plurality of sensor-type STAs.

The foregoing description provides a non-limiting example of the computer-readable medium 806 of the AP 802. Although various computer-executable instructions (e.g., computer-executable code) have been described above, one of ordinary skill in the art will understand that the computer-readable medium 806 may also include various other computer-executable instructions (not shown) that are in addition and/or alternative(s) to instructions 840, 841, 842, 843. Such other computer-executable instructions (not shown) may be configured for performing any one or more of the functions, methods, processes, features and/or aspects described herein.

The memory 814 may include various memory modules. The memory modules may be configured to store, and have read therefrom, various values and/or information by the processor 804, or any of its circuits 820, 821, 822, 823. The memory modules may also be configured to store, and have read therefrom, various values and/or information upon execution of the computer-executable code included in the computer-readable medium 806, or any of its instructions 840, 841, 842, 843. The memory 814 may include communication attributes information 830. As mentioned above, such communication attributes may include various parameters, measurements, signals, and/or information pertaining to the communication behavior of the STA without deviating from the scope of the present disclosure. In some examples, such communication attributes information includes information associated with the packet size, inter-arrival time, and/or inter-arrival time of communications of the STA. The memory 814 may also include station identity information 831. The identity information provided by the STA to the AP 802 may be stored in the memory 814 as station identity information 831 and subsequently utilized in various processes and/or methods described in greater detail herein. One of ordinary skill in the art will appreciate that the memory 814 may also include various other memory modules, each pertaining to one or more of the aspects described in greater detail herein, without deviating from the scope of the present disclosure.

One of ordinary skill in the art will also understand that the AP 802 may include alternative and/or additional features without deviating from the scope of the present disclosure. In accordance with various aspects of the present disclosure, an element, or any portion of an element, or any combination of elements may be implemented with a processing system that includes one or more processors 804. Examples of the one or more processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 816 and bus interface 808. The bus 816 may include any number of interconnecting buses and bridges depending on the specific application of the processing system and the overall design constraints. The bus 816 may link together various circuits including the one or more processors 804, the memory 814, and the computer-readable medium 806. The bus 816 may also link various other circuits such as timing sources, peripherals, voltage regulators, and power management circuits, which are well known in the art.

The one or more processors 804 may be responsible for managing the bus 816 and general processing, including the execution of software stored on the computer-readable medium 806. The software, when executed by the one or more processors 804, causes the processing system to perform the various functions described below for any one or more apparatuses. The computer-readable medium 806 may also be used for storing data that is manipulated by the one or more processors 804 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may also include, by way of example, a carrier wave, a transmission line, and any other suitable medium for transmitting software and/or instructions that may be accessed and read by a computer. The computer-readable medium 806 may reside in the processing system, external to the processing system, or distributed across multiple entities including the processing system. The computer-readable medium 806 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 9:
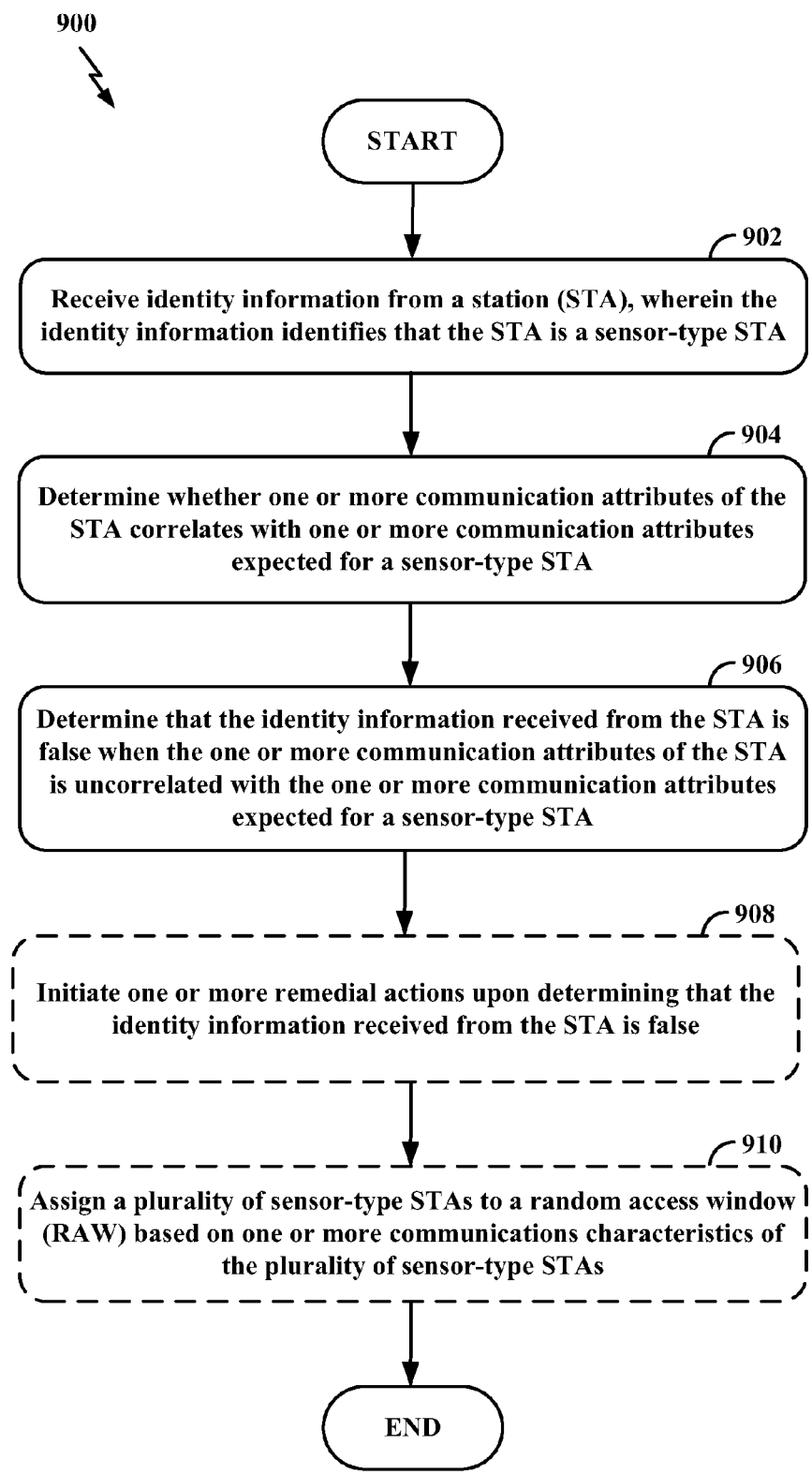
FIG. 9 is a diagram illustrating an example of various methods and/or processes according to aspects of the present disclosure.

FIG. 9 is a diagram 900 illustrating an example of various methods and/or processes according to aspects of the present disclosure. Such method and/or processes may be performed by an AP (e.g., AP 102, 602, 702, 802). Such methods and/or processes may additionally or alternatively be performed by various other types of apparatuses without deviating from the scope of the present disclosure. Various examples of sensor-type STAs and non-sensor-type STAs are described above, e.g., with reference to FIG. 1, and therefore will not be repeated. At block 902, the AP may receive identity information from a STA, wherein the identity information identifies that the STA is a sensor-type STA. Additional description pertaining to sensor-type STAs and non-sensor-type STAs is provided above and therefore will not be repeated.

At block 904, the AP may determine whether one or more communication attributes of the STA correlates with one or more communication attributes expected for a sensor-type STA. At block 906, the AP may determine that the identify information received from the STA is false when the one or more communication attributes of the STA is uncorrelated with the one or more communication attributes expected for a sensor-type STA. In some examples, the identity information received from the STA is false when the one or more communication attributes of the STA is insufficiently correlated with the one or more communication attributes expected for the sensor-type STA. The one or more communication attributes of the STA may be insufficiently correlated with the one or more communication attributes expected for the sensor-type STA when the one or more communication attributes of the STA deviate by more than a predetermined amount from the one or more communication attributes expected for the sensor-type STA.

In some configurations, at block 908, the AP may initiate one or more remedial actions upon determining that the identity information received from the STA is false. In some examples, such remedial actions may include blocking one or more future communications with the STA. In some examples, such remedial actions may include communicating a warning message to the STA, wherein the warning message indicates that the identity information received from the STA is false. In some examples, such remedial actions may include assigning the STA to an access window that is not restricted to sensor-type STAs. Additional description pertaining to such remedial actions is provided above and therefore will not be repeated.

In some configurations, at block 910, the AP may assign a plurality of sensor-type STAs to a RAW based on one or more communication attributes of the plurality of sensor-type STAs. For example, a plurality of sensor-type STAs may exhibit a common communication attribute (e.g., a common packet size, a common inter-arrival time, a common inter-arrival time variance, etc.). The AP may group these sensor-type STAs to a particular RAW. In this RAW, that plurality of STAs may contend for the communication channel. Outside of that RAW, other STAs may have an opportunity to contend for the communication channel. For example, referring to FIG. 4, S-STA$_1$ through S-STA$_n$ may be grouped together based on such communication attributes and, together, assigned to RAW$_1$.

The methods and/or processes described with reference to FIG. 9 are provided for illustrative purposes and are not intended to limit the scope of the present disclosure. The methods and/or processes described with reference to FIG. 9 may be performed in sequences different from those illustrated therein without deviating from the scope of the present disclosure. Additionally, some or all of the methods and/or processes described with reference to FIG. 9 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Additional description pertaining to the present disclosure is provided in the Appendix filed concurrently herewith. The description herein is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The invention claimed is:

1. An apparatus configured for wireless communication, the apparatus comprising:
   a transceiver;
   a memory; and
   at least one processor communicatively coupled to the transceiver and the memory, wherein the at least one processor is configured to:
      utilize the transceiver to receive identity information from a station (STA), wherein the identity information identifies the STA as a sensor-type STA;
      determine whether one or more communication attributes of the STA correlates with one or more communication attributes expected for a sensor-type STA; and
      determine that the identity information received from the STA is false when the one or more communication attributes of the STA is uncorrelated with the one or more communication attributes expected for a sensor-type STA.

2. The apparatus of claim 1, wherein determining whether one or more communication attributes of the STA correlates with one or more communication attributes expected for a sensor-type STA comprises:
   determining whether a size of a packet received from the STA correlates with a size of a packet expected for the sensor-type STA.

3. The apparatus of claim 1, wherein determining whether one or more communication attributes of the STA correlates with one or more communication attributes expected for a sensor-type STA comprises:
   determining whether an inter-arrival time of packets received from the STA correlates with an inter-arrival time of packets expected for the sensor-type STA.

4. The apparatus of claim 1, wherein determining whether one or more communication attributes of the STA correlates with one or more communication attributes expected for a sensor-type STA comprises:

determining whether an inter-arrival time variance of packets received from the STA correlates with an inter-arrival time variance of packets expected for the sensor-type STA.

5. The apparatus of claim 1, wherein the at least one processor is further configured to:
  initiate one or more remedial actions upon determining that the identity information received from the STA is false.

6. The apparatus of claim 5, wherein the one or more remedial actions comprise blocking one or more future communications with the STA.

7. The apparatus of claim 5, wherein the one or more remedial actions comprise communicating a warning message to the STA, wherein the warning message indicates that the identity information received from the STA is false.

8. The apparatus of claim 5, wherein the one or more remedial actions comprise assigning the STA to an access window that is not restricted to sensor-type STAs.

9. The apparatus of claim 1, wherein the at least one processor is further configured to:
  assign a plurality of sensor-type STAs to a random access window (RAW) based on one or more communication attributes of the plurality of sensor-type STAs.

10. The apparatus of claim 1, wherein the STA utilizes a sub-1 Gigahertz (GHz) frequency and complies with a communication protocol of Institute of Electrical and Electronics Engineers (IEEE) 802.11ah.

11. A method of wireless communication, the method comprising:
  utilizing a transceiver to receive identity information from a station (STA), wherein the identity information identifies the STA as a sensor-type STA;
  determining whether one or more communication attributes of the STA correlates with one or more communication attributes expected for a sensor-type STA; and
  determining that the identity information received from the STA is false when the one or more communication attributes of the STA is uncorrelated with the one or more communication attributes expected for a sensor-type STA.

12. The method of claim 11, wherein determining whether one or more communication attributes of the STA correlates with one or more communication attributes expected for a sensor-type STA comprises:
  determining whether a size of a packet received from the STA correlates with a size of a packet expected for the sensor-type STA.

13. The method of claim 11, wherein determining whether one or more communication attributes of the STA correlates with one or more communication attributes expected for a sensor-type STA comprises:
  determining whether an inter-arrival time of packets received from the STA correlates with an inter-arrival time of packets expected for the sensor-type STA.

14. The method of claim 11, wherein determining whether one or more communication attributes of the STA correlates with one or more communication attributes expected for a sensor-type STA comprises:
  determining whether an inter-arrival time variance of packets received from the STA correlates with an inter-arrival time variance of packets expected for the sensor-type STA.

15. The method of claim 11, further comprising:
  initiating one or more remedial actions upon determining that the identity information received from the STA is false.

16. The method of claim 15, wherein the one or more remedial actions comprise blocking one or more future communications with the STA.

17. The method of claim 15, wherein the one or more remedial actions comprise communicating a warning message to the STA, wherein the warning message indicates that the identity information received from the STA is false.

18. The method of claim 15, wherein the one or more remedial actions comprise assigning the STA to an access window that is not restricted to sensor-type STAs.

19. The method of claim 11, further comprising:
  assigning a plurality of sensor-type STAs to a random access window (RAW) based on one or more communication attributes of the plurality of sensor-type STAs.

20. The method of claim 11, wherein the STA utilizes a sub-1 Gigahertz (GHz) frequency and complies with a communication protocol of Institute of Electrical and Electronics Engineers (IEEE) 802.11ah.

21. A computer-readable medium storing computer-executable code comprising instructions configured to:
  receive identity information from a station (STA), wherein the identity information identifies the STA as a sensor-type STA;
  determine whether one or more communication attributes of the STA correlates with one or more communication attributes expected for a sensor-type STA; and
  determine that the identity information received from the STA is false when the one or more communication attributes of the STA is uncorrelated with the one or more communication attributes expected for a sensor-type STA.

22. The computer-readable medium of claim 21, wherein determining whether one or more communication attributes of the STA correlates with one or more communication attributes expected for a sensor-type STA comprises:
  determining whether a size of a packet received from the STA correlates with a size of a packet expected for the sensor-type STA.

23. The computer-readable medium of claim 21, wherein determining whether one or more communication attributes of the STA correlates with one or more communication attributes expected for a sensor-type STA comprises:
  determining whether an inter-arrival time of packets received from the STA correlates with an inter-arrival time of packets expected for the sensor-type STA.

24. The computer-readable medium of claim 21, wherein determining whether one or more communication attributes of the STA correlates with one or more communication attributes expected for a sensor-type STA comprises:
  determining whether an inter-arrival time variance of packets received from the STA correlates with an inter-arrival time variance of packets expected for the sensor-type STA.

25. The computer-readable medium of claim 21, wherein the instructions are further configured to:
  initiate one or more remedial actions upon determining that the identity information received from the STA is false.

26. The computer-readable medium of claim 25, wherein the one or more remedial actions comprise:
  blocking one or more future communications with the STA;
  communicating a warning message to the STA, wherein the warning message indicates that the identity information received from the STA is false; and
  assigning the STA to an access window that is not restricted to sensor-type STAs.

27. An apparatus configured for wireless communication, the apparatus comprising:
- means for receiving identity information from a station (STA), wherein the identity information identifies the STA as a sensor-type STA;
- means for determining whether one or more communication attributes of the STA correlates with one or more communication attributes expected for a sensor-type STA; and
- means for determining that the identity information received from the STA is false when the one or more communication attributes of the STA is uncorrelated with the one or more communication attributes expected for a sensor-type STA.

28. The apparatus of claim 27, wherein the means for determining whether one or more communication attributes of the STA correlates with one or more communication attributes expected for a sensor-type STA is configured to:
- determine whether a size of a packet received from the STA correlates with a size of a packet expected for the sensor-type STA;
- determine whether an inter-arrival time of packets received from the STA correlates with an inter-arrival time of packets expected for the sensor-type STA; and
- determine whether an inter-arrival time variance of packets received from the STA correlates with an inter-arrival time variance of packets expected for the sensor-type STA.

29. The apparatus of claim 27, further comprising:
- means for initiating one or more remedial actions upon determining that the identity information received from the STA is false.

30. The apparatus of claim 29, wherein the means for initiating one or more remedial actions in configured to:
- block one or more future communications with the STA;
- communicate a warning message to the STA, wherein the warning message indicates that the identity information received from the STA is false; and
- assign the STA to an access window that is not restricted to sensor-type STAs.

* * * * *